Jan. 12, 1926.
J. F. TREVORROW
TIRE LEVER
Filed Nov. 14, 1922
1,569,310
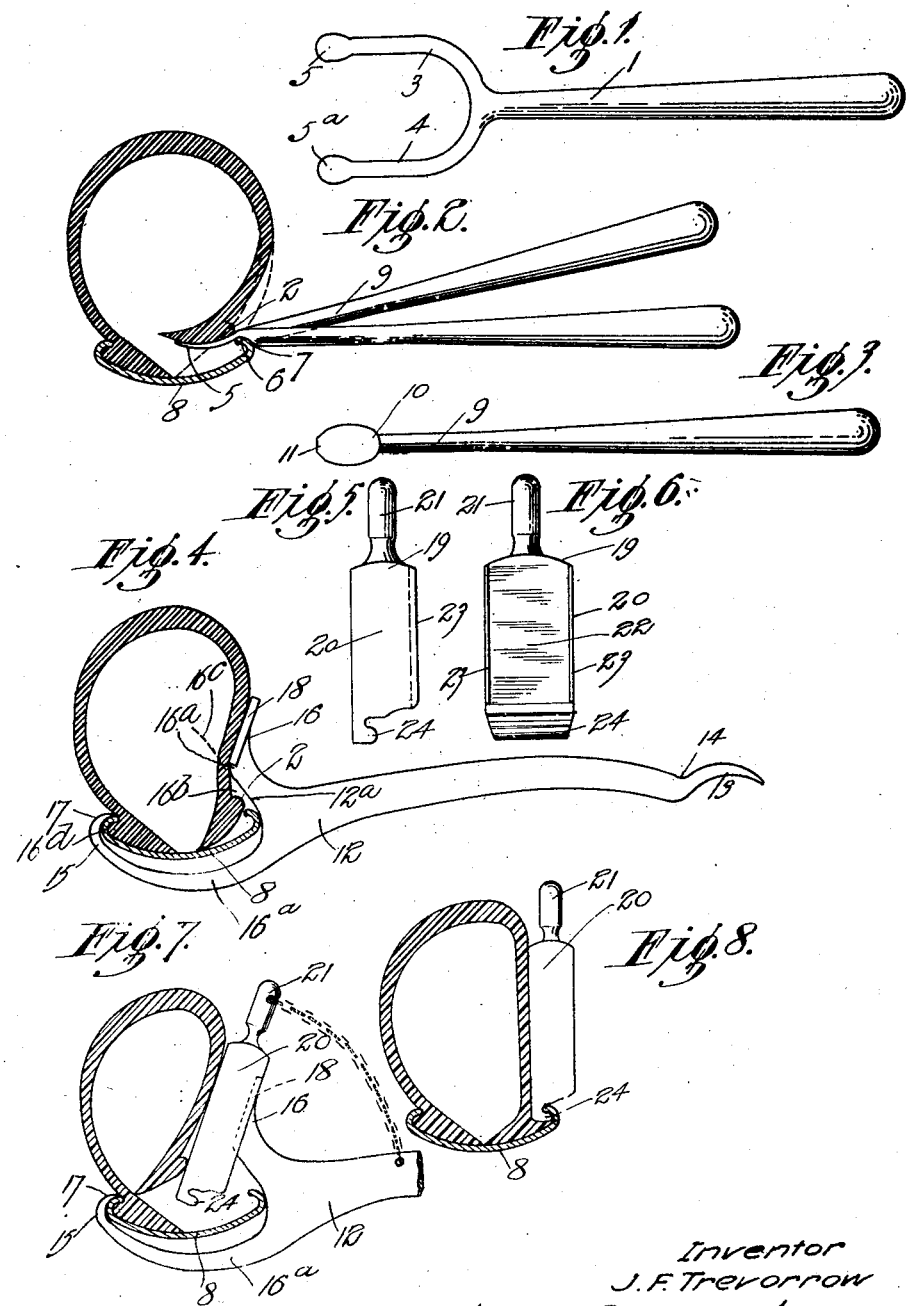
Inventor
J. F. Trevorrow
by Langner, Perry, Card + Langner
Att'ys.

Patented Jan. 12, 1926.

1,569,310

UNITED STATES PATENT OFFICE.

JOHN FRANCIS TREVORROW, OF SOUTH MELBOURNE, VICTORIA, AUSTRALIA.

TIRE LEVER.

Application filed November 14, 1922. Serial No. 600,961.

*To all whom it may concern:*

Be it known that JOHN FRANCIS TREVORROW, a citizen of the Commonwealth of Australia, and resident of 308 City Road, South Melbourne, in the State of Victoria, Commonwealth of Australia, has invented certain new and useful Improvements in Tire Levers, of which the following is a specification.

This invention relates to improvements in tire levers and has been devised in order to provide means whereby a tire may be rapidly and easily removed from a wheel rim with the minimum effort.

The invention is particularly directed to that class of lever wherein said lever is provided with a starting end of any desired form and wherein a gripping portion is formed on the lever to engage the beading on a wheel rim.

The difficulty of removing tires particularly those of heavy type lies in the primary entrance of the lever in such a manner that a portion of the tire is lifted and pulled over the wheel rim.

This may be accomplished in various ways, but the difficulty arises in the use of means whereby the tire can be sufficiently forced over to one side to allow of a portion of same being removed from the rim and means also where a further bite can be obtained so as to make the removal of a tire from a wheel rim a comparatively easy operation.

The means for accomplishing the object described consists of several parts set out as follows:—

(*a*) The use of a forked lever of convenient length each fork prong terminating in a spoon shaped end slightly spatulated, the spoon portion of each prong being flattened considerably and being formed on the underside with a depression adapted to engage the beading of a wheel rim.

(*b*) The use of a slightly spatulated spoon ended lever member having a single operative end shaped somewhat like a screw driver.

(*c*) The use of a goose-necked lever member formed at one end with a slightly spatulated spoon shaped device, and at the other end with a curved member having two extensions emanating from the lever arm, one extension terminating in an angularly disposed plane surfaced square edged member, the other extremity terminating in a chisel edged and slightly hooked device, the two members described being connected by a curve formed from a number of predetermined radii, the combination with the lever described of a member adapted to increase the purchase thereof, said member being provided with a handle connecting a substantially rectangular block provided on the face thereof and at each edge with raised beadings to form a guide the lower end of said block being formed to fit over the beading of a wheel rim.

But in order to more readily understand the invention it will now be described with reference to the accompanying drawings in which:—

Figure 1 is a plan view of a tire lever formed according to my invention and provided with a double pronged end.

Figure 2 is a view showing position of levers when removing a tire from a wheel rim.

Figure 3 is a view showing single pronged lever for use in conjunction with the lever illustrated in Figure 1.

Figure 4 is a view showing a further lever construction.

Figures 5 and 6 are views in side elevation and front elevation respectively of a block member for use with the lever illustrated in Figure 4.

Figure 7 is a view showing the application of the lever illustrated in Figure 4 with the block member, and Figure 8 is a view showing the block member used as a definite starting point when replacing a tire upon a wheel rim.

According to this invention and in order to remove a tire from a wheel rim a lever as 1 is first engaged with the tire beading 2.

To allow of this the lever 1 is formed with two prongs 3—4, each terminating in a slightly spatulated spoon shaped end 5—5ª.

Formed on the underside of the lever 1 and near the spatulated ends thereof are depressions 6 adapted to engage the beaded edge 7 of the wheel rim 8 and besides providing a gripping position for the lever 1 and preventing same from slipping, it also provides a definite gauge for the depth of entry of the lever end and therefore prevents injury to the inner tube by forcing said lever end too far under the beading 2 of the tire.

Upon the entry of the double pronged member or lever 1 under the beading 2 of the tire, a further bite may be obtained by placing a single pronged lever 9 between the legs of the double pronged lever once the same has been inserted under the beading 2 of the tire sufficiently to lift the same a convenient height enabling the single pronged lever 9 to hold the tire, when the double pronged lever may be withdrawn and inserted at another position on the wheel rim, so that the tire may be sufficiently displaced to allow of its removal from the rim 8.

The single pronged lever 9 is formed at the end 10 somewhat similarly to that described in reference to the double pronged lever 1, only that, besides the extremity thereof being spoon shaped, the point 11 is formed somewhat like a screw driver.

The two levers described are sufficient in most cases for the purpose of removing a tire from a wheel rim but should it be found difficult or impossible to remove a tire by the use of the devices described a lever 12 may be used.

This lever 12 consists of a lever arm the one end whereof terminating in a spoon shaped and slightly spatulated member 13 and a depression 14 for engaging the beading of a wheel rim when so desired.

The opposite end of the lever 12 is formed with two extensions 15—16 the extension 15 terminating in a slightly hooked device 17 adapted to engage the beading on the wheel rim at the opposite side of the wheel to the operator, while the end 16 terminates in an angularly disposed plane surfaced square edged member 18 which is adapted to engage the tire and force the beading 2 clear of the beading 7 of a wheel rim 8.

By connecting the ends 15—16 by a suitable curve 16$^a$ sufficient clearance is given the lever over the wheel rim 8 to enable the tire being forced over a considerable distance but should it be found that the leverage at the disposal of the user is limited and insufficient to obtain the desired result a member 19 is used and which comprises a body 20 provided on the top thereof with a handle 21 preferably formed integral with said body 20.

The surface 22 of the member 19 is provided at the sides with fillets 23 and the lower end of the body 19 is formed with means as 24 adapted to engage the beading 7 of a wheel rim 8, the means 24 enabling the user to place the member 19 in position on a wheel rim by forcing the tire over slightly which allows the end 24 of the member 19 to pass in under the rim 7 and be held there by the pressure of the tire against it.

When the member 19 is in position the lever 12 may then be operated the portion 18 thereof riding upon the surface 22 of the member 19 and between the fillets 23 thereof, which prevent the lever 12 from moving erratically.

By moving the lever 12 upwardly when the member 19 is in position a greater purchase is obtained and is sufficient to cause the tire to leave the rim 7 and allow of its removal.

When it is desired to replace a tire upon a wheel rim once repairs have been effected, a difficulty presents itself owing to the practically rigid state of the beading of said tire and although it is simple to place one portion of the beading over the rim immediately the operator commences to place further portions of the tire upon the rim, the parts already on said rim dislodge and will continue to do so unless held in some manner which will prevent such dislodging.

The member 19 provides the means for overcoming this occurrence and if the portion 24 of the body 20 is placed on the rim 8 in the manner described it serves to pin one portion of the tire to said rim whilst the operator forces the tire upon the rim by the use of the levers described.

Immediately the tire is in position upon a wheel rim, it is necessary to remove the member 19 from the rim 8 and in order to perform this operation the lever 12 is again used, the portion 18 thereof moving upon the surface 22 of the member 19 which forces the said member inwardly towards the tire to the position shown in Figure 7 or in the manner adopted when removing a tire from a wheel rim, when the member 19 can be withdrawn and the lever 12 released when the tire will take its correct position again, i. e. the beading 2 thereof moving into the beading 7 of a wheel rim 8.

Any other suitable device may be used in lieu of the device 20 to operate with the lever 12 to perform the functions embodied herein.

A most essential feature embodied in the invention consists in forming the extension 16 with a practically straight inner wall 12$^a$ so as to prevent any tendency for the edge 16$^a$ to lock in the bead 16$^b$ of the tire in any position that the lever 12 may occupy in its various operations, the shape of the said inner wall 12$^a$ being determined by a radius as shown by dotted lines 16$^c$ struck from the centre of the opposite outside edge 16$^d$ of the bead.

The invention therefore comprises a combination of parts as above described operating in the manner specified.

It is desired to be understood that various improvements and modifications may be embodied without departing from the spirit or scope of the invention, the essential characteristic of which consists in the combination with a lever device having two functioning extremities one of which is a plane surfaced and square edged member of a block adapted to increase the purchase of the lever with which it operates, the use of double and single pronged levers operating in conjunction with the lever above described or separately thereto, or in lieu of the said block any other suitable device may be adapted to operate in conjunction with the plane surfaced square edged member for the purposes described.

What I claim as my invention and desire to secure by Letters Patent is:—

Means for removing a tire from a wheel rim, comprising, in combination, a lever, a block member having a gripping portion on the lower end thereof for engaging the beading of a wheel rim, the upper end of said block member having a handle thereon, a filleted surface on the block, and a member on the lever arranged to move upon the filleted surface, as described.

Signed at Melbourne, Victoria, Australia, this 11th day of October 1922.

JOHN FRANCIS TREVORROW.